June 23, 1942.　　　W. KOHLHAGEN　　　2,287,043
REGULATING DEVICE FOR TIMEPIECES
Filed Jan. 19, 1940　　　5 Sheets-Sheet 1

Inventor
Walter Kohlhagen
by Seymour Earle Nichols
Attorneys

June 23, 1942.    W. KOHLHAGEN    2,287,043
REGULATING DEVICE FOR TIMEPIECES
Filed Jan. 19, 1940    5 Sheets-Sheet 2

Inventor
Walter Kohlhagen
Seymour Earle Nichols
Attorneys

June 23, 1942.   W. KOHLHAGEN   2,287,043
REGULATING DEVICE FOR TIMEPIECES
Filed Jan. 19, 1940   5 Sheets-Sheet 3
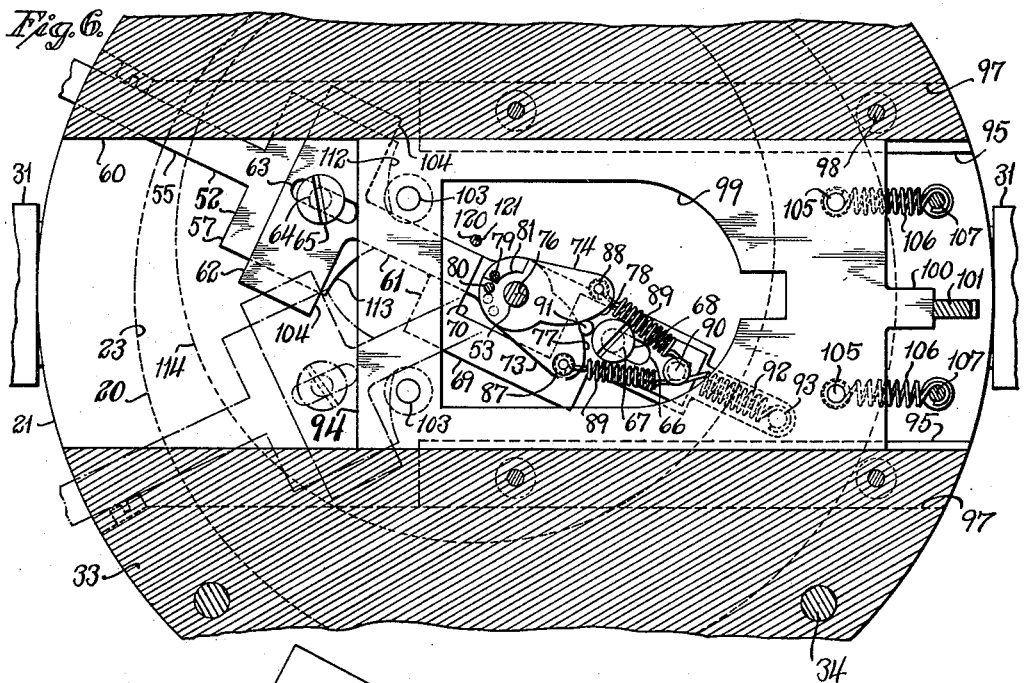
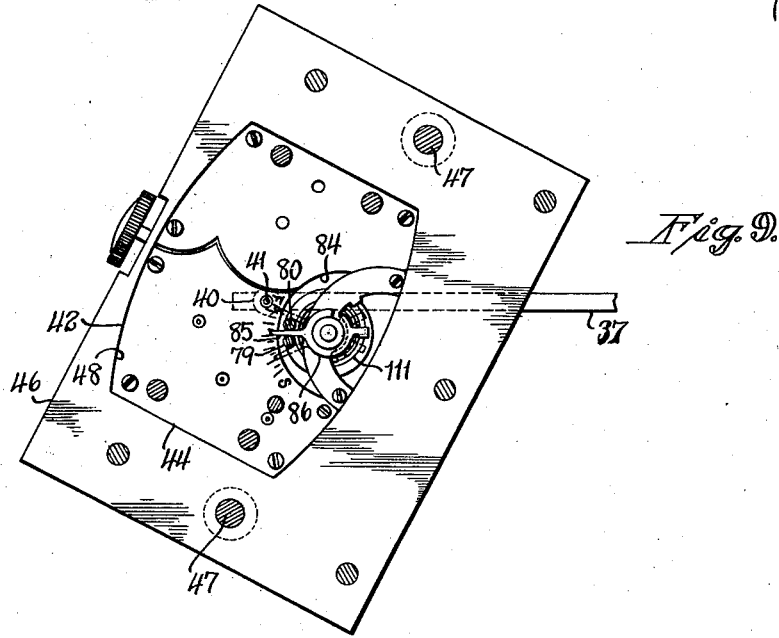
Inventor
Walter Kohlhagen
Seymour Earl Nichols
Attorneys

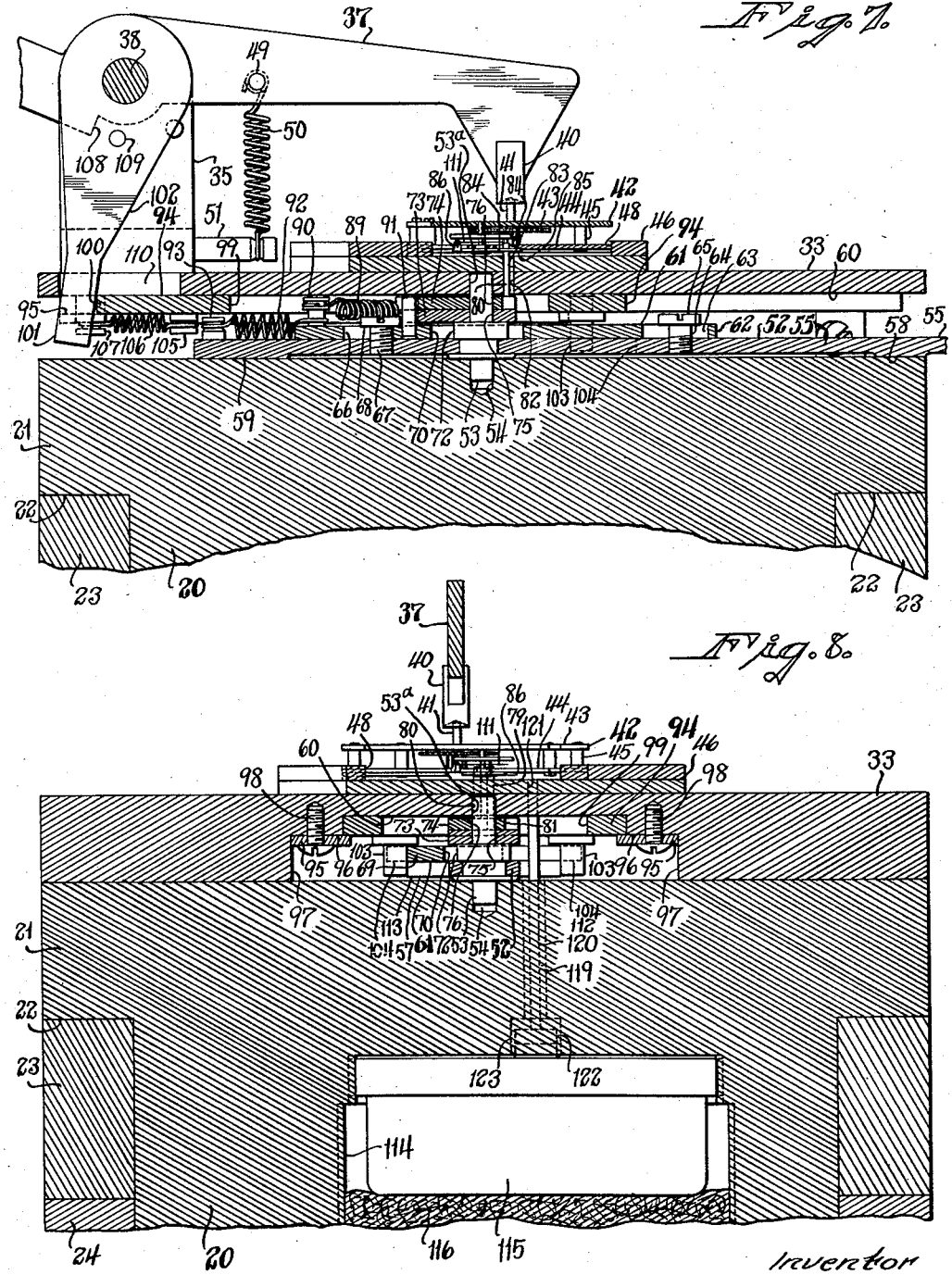

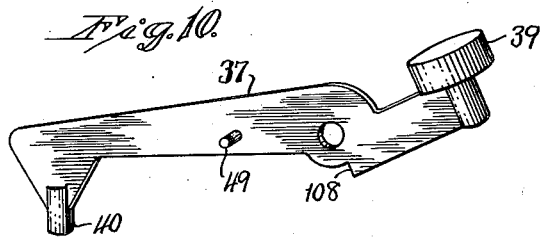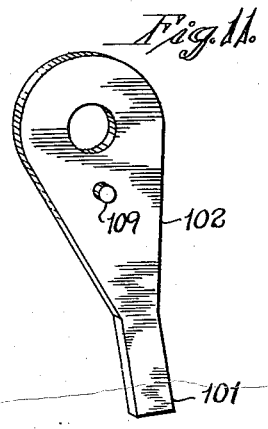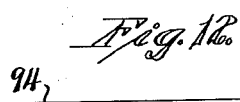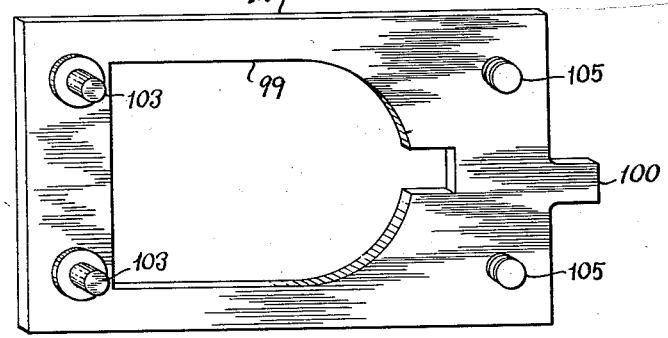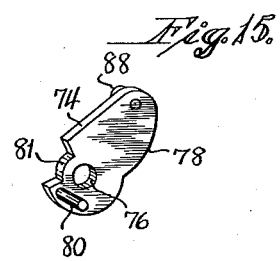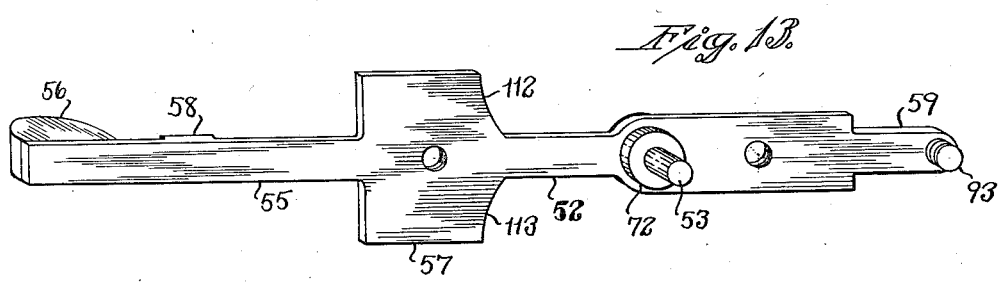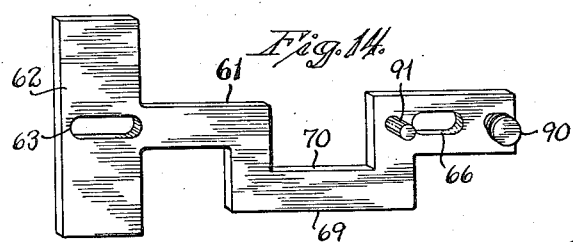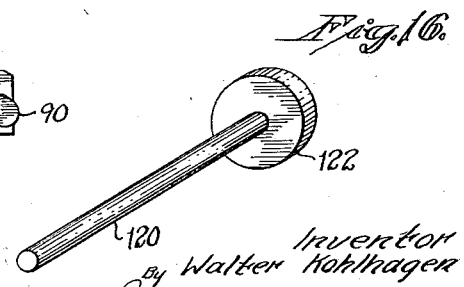

Patented June 23, 1942

2,287,043

UNITED STATES PATENT OFFICE 2,287,043

REGULATING DEVICE FOR TIMEPIECES

Walter Kohlhagen, Elgin, Ill.

Application January 19, 1940, Serial No. 314,609

16 Claims. (Cl. 73—52)

This invention relates to improvements in regulating-devices and more particularly to regulating-devices for time instruments such, for instance, as clocks and watches, time-fuses, etc.

One of the objects of the present invention is to provide a superior device of the character referred to, whereby timepieces may be rapidly and accurately regulated.

A further object of the present invention is to provide a superior regulating-device for timepieces wherein provision is made for testing and regulating the timepiece in a variety of positions, without requiring the removal of the timepiece from the device.

A further object of the present invention is to provide a superior regulating-device whereby the operator is relieved of the need for an excessive number of motions.

Still another object of the present invention is to provide a regulating-device adapted to receive a timepiece movement and provided with superior means whereby the regulator of the timepiece may be engaged for subsequent operation in situ despite wide variations in the positions of the regulators of various timepieces as the same are sequentially connected to the regulating-device.

A further object of the present invention is to provide a superior regulating-device for timepieces in combination with an indicator serving to indicate the rate of oscillation of the frequency of the timepiece, in combination with means whereby the regulating of the timepiece may be effected while the observations of its performance are being noted.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 4 is a broken horizontal sectional view taken on the line 4—4 of Fig. 2, but on a larger scale;

Fig. 5 is a similar view but showing the parts in the positions they assume when the clamping-fingers are spread apart for the reception of the regulator pointer-arm of a timepiece;

Fig. 6 is a similar view but showing the regulating lever at the limit of one direction of its movement for effecting the regulation of the timepiece;

Fig. 7 is a broken view in vertical central section taken on the line 7—7 of Fig. 1;

Fig. 8 is a broken view in vertical transverse section taken on the line 8—8 of Fig. 2;

Fig. 9 is a horizontal section taken on the line 9—9 of Fig. 2;

Fig. 10 is a perspective view of the movement-retaining lever detached;

Fig. 11 is a similar view of the slide-actuating arm;

Fig. 12 is a similar view of the actuating- or movement-transmitting slide looking mainly at the under side thereof;

Fig. 13 is a perspective view of the impulse- or beat-frequency regulating-lever, detached;

Fig. 14 is a similar view of the cam-actuating bar;

Fig. 15 is a similar view of one of the cams together with its clamping-finger mounted thereon; and Fig. 16 is a perspective view of the frequency-transmitting rod or plunger, detached.

Figure 1:
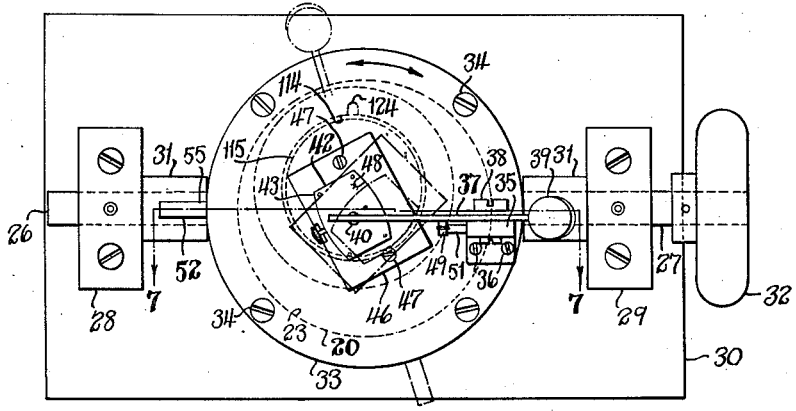
Fig. 1 is a plan view of a regulating-device for timepieces embodying the present invention, and showing a watch-movement in place thereon.

For the purposes of illustration, the regulating-device shown in the drawings includes a cylindrically-contoured body-member generally designated by the reference character 20, the said body-member being provided with a head 21 resulting in the formation of a downwardly-facing annular shoulder 22. The annular shoulder 22 is adapted to be seated against the upper edge of a supporting-ring 23, the main portion of the body-member 20 passing axially through the said supporting-ring 23 with freedom for rotation therein and extending beyond the lower edge of the said supporting-ring to a degree sufficient to permit a retaining-ring 24 to be installed upon the outer periphery thereof. The retaining-ring 24 is fixedly secured to the body-member 20 by a set-screw 25 to thus, in effect, cause the retaining-ring 24 to form a rigid unitary part of the body-member 20.

The supporting-ring 23 is provided at diametrically-opposite points with radially-extending pivot-pins 26 and 27 rigidly secured thereto to permit the supporting-ring 23, and hence the body-member 20 and the parts carried thereby, to be rotated about a substantially-horizontal axis. The pivot-pins 26 and 27 just referred to, are supported by and respectively have bearing in mounting-posts 28 and 29 upwardly extending from and rigidly secured to a base-plate or -member 30. Mounted respectively upon the pivot-pins 26 and 27 between the supporting-ring 23 and the posts 28 and 29, are spacing-collars 31—31 which serve to space the body-member 20 in a central position laterally between the said mounting-posts. It will thus be seen, and as particularly well shown in Fig. 2 of the drawings, that the body-member 20 is suspended between the mounting-posts 28 and 29 for both axial rotational movement and for bodily rotation about a substantially-horizontal axis perpendicular to the axis about which the said body-member itself is rotatable in the supporting-ring. To facilitate the rotation of the body-member 20 about a substantially-horizontal axis, the pivot-pin 27 is extended beyond the outer face of the mounting-post 29 sufficiently to have secured thereto a hand-wheel 32 as clearly shown in Figs. 1, 2 and 3.

Mounted upon the upper face of the head 21 of the body-member 20 is a cover-plate 33 rigidly secured to the head 21 by means of screws 34 (see Fig. 1). The cover-plate 33 just referred to, has, in turn, mounted thereon an L-shaped bracket 35 rigidly secured in place adjacent the outer periphery of the said cover-plate by means of screws 36, as is particularly well shown in Fig. 1 of the drawings. Adjacent the outer end of the vertical reach of the L-shaped bracket 35 is mounted a movement-retaining lever generally designated by the reference character 37, and pivotally mounted for vertical movement intermediate its opposite ends to the vertical reach of the L-shaped bracket 35, by means of a pivot-screw 38.

At its outer end the retaining-lever 37 is provided with a fingerpiece 39 while at its inner or opposite end the said retaining-lever is formed with a cylindrical movement-retaining nose 40 adapted to yieldingly engage the center-arbor 41 of a timepiece-movement to be regulated which is generally designated by the reference character 42. The timepiece-movement 42 just referred to, may be of any usual form but, as shown particularly well in Figs. 7 and 8 of the drawings, the said timepiece-movement includes a front movement-plate 43 and a rear movement-plate 44 held in spaced relationship parallel to each other by means of pillars 45.

Mounted substantially centrally of the cover-plate 33 upon the outer or upper face thereof is a movement-positioning plate 46 secured in fixed relationship to the cover-plate 33 by means of screws 47 as is clearly shown in Fig. 1 of the drawings. The movement-positioning plate 46 is provided in the outer face thereof, with a movement-positioning cavity 48 corresponding in outline to the rear movement-plate 44 of the timepiece-movement 42. The movement-positioning cavity 48 is of sufficient depth to receive the rear movement-plate 44 of the timepiece-movement 42 to thus correctly position or locate the said timepiece-movement for the purpose hereinafter to appear, and to properly locate the center-arbor 41 of the said timepiece-movement with respect to the movement-retaining nose 40 formed on the inner end of the movement-retaining lever 37, as previously described.

As has been previously pointed out, the retaining-nose 40 of the movement-retaining lever 37 is designed to be yieldingly held in engagement with the outer end of the center-arbor 41 of the time-piece-movement 42. For this purpose the movement-retaining lever 37 is provided with a pin 49 projecting outwardly from one side thereof and around which is hooked one end of a spring 50, the opposite end of which is secured to a pin 51 projecting from the edge of the L-shaped bracket 35 adjacent the outer face of the cover-plate 33 as is particularly well shown in Fig. 7 of the drawings. It will thus be seen that the spring 50 serves to yieldingly hold the movement-retaining nose 40 in engagement with the center-arbor 41 of the timepiece-movement 42 for the purpose of yieldingly retaining the said timepiece-movement in the movement-positioning cavity 48 and that the said movement-retaining lever 37 is permitted to be moved outwardly away from the timepiece-movement 42 against the tension of the spring 50 by downward pressure being applied to the fingerpiece 39 located at the outer end of the said retaining-lever 37.

Extending radially outwardly and pivotally mounted for lateral movement upon the upper face of the head 21 of the body-member 20, is a beat- or impulse-frequency regulating-lever generally designated by the reference character 52, the said regulating-lever being rigidly secured intermediate its opposite ends to a shaft 53. The lower end of the said shaft 53 bears in a bearing-socket 54 formed in the upper face of the head 21 of the body-member 20 on the vertical axis of the latter, while the upper end of the said shaft has bearing in a bearing-passage 53a formed in the cover-plate 33 in line with the bearing-socket 54.

The outer arm 55 of the regulating-lever 52 extends outwardly beyond the outer periphery of the head 21 and terminates in a depending fingerpiece 56. Intermediate the shaft 53 and the outer end of the said arm 55 the latter is broadened laterally to form an enlarged portion 57 for the purpose as will hereinafter appear. The arm 55 of the regulating-lever 52 is also formed intermediate the shaft 53 and its outer end upon the underside of the said arm 55 with a bearing-surface 58 adapted to bear upon the upper face of the head 21 adjacent the outer periphery thereof as is clearly shown in Fig. 7 of the drawings. At its inner end the regulating-lever 52 is also formed upon the underside thereof with a bearing-surface 59 complemental to the bearing-surface 58 and which is also adapted to bear upon the upper face of the head 21 as is clearly shown in the figure just referred to. It may here be noted that the regulating-lever 52, and the parts carried thereby which will later be described, is acommodated in a transverse groove 60 formed in the under face of the cover-plate 33 and which is particularly well shown in Figs. 7 and 8 of the drawings.

Mounted with capacity for longitudinal reciprocating movement upon the upper face of the regulating-lever 52 is a cam-actuating bar generally designated by the reference character 61 which is particularly well shown in Fig. 14 of the drawings. The said actuating-bar 61 is formed at the end thereof adjacent the enlarged portion 57 of the regulating-lever 52, with an enlarged flat head-like portion 62 which is adapted to slidingly bear upon the enlarged portion 57 forming part of the regulating-lever 52. The head-like portion 62, as may be seen by reference to Figs. 4 to 6 inclusive, projects beyond the side edges of the enlarged portion 57 of the regulating-lever 52 for the purpose later to be described.

Along the longitudinal axis of the actuating-bar 61 the head-like portion 62 thereof is formed with a longitudinal guide-slot 63 through which extends a guide-screw 64, the said guide-screw being threaded into the enlarged portion 57 of the regulating-lever 52. The said guide-screw 64 is also formed with an enlarged retaining-head 65 which is seated against the outer or upper face of the cam-actuating bar 61. The end of the cam-actuating bar 61 opposite to the head-like portion 62 is also formed with a longitudinal guide-slot 66 through which passes a guide-screw 67 similar to the guide-screw 64 just described, and which is threaded into the adjacent portion of the regulating-lever 52 and is formed with an enlarged retaining-head 68 seated against the upper face of the cam-actuating bar 61. As thus constructed and arranged, the cam-actuating bar 61 is capable of being bodily reciprocated longitudinally of the regulating-lever 52 by which it is slidably carried to thus virtually form a reciprocating part of the regulating-lever 52, the guide-screws 64 and 67 controlling the direction of reciprocating movement of the cam-actuating bar upon the upper face of the regulating-lever 52.

Intermediate its opposite ends the cam-actuating bar 61 is formed with a U-shaped offset portion 69 which results in the formation of a clearance-recess 70 located adjacent to and partially surrounding the shaft 53 by means of which the regulating-lever 52 is pivotally mounted upon the upper face of the head 21 of the body-member 20 to thus permit the cam-actuating bar 61 to be reciprocated upon the upper face of the regulating-lever 52.

Returning to the shaft 53 it will be noted by reference to Figs. 7, 8 and 13 in particular, that the said shaft is provided intermediate its opposite ends with an annular enlarged portion 72 adjacent the upper face of the regulating-lever 52 and of slightly greater thickness than the cam-actuating bar 61. The annular enlarged portion 72 of the shaft 53 has bearing upon its upper face, the lower one of two substantially-corresponding horizontally-arranged cams 73 and 74 arranged one over the other. Mounted upon the lower cam 73 is the corresponding cam 74 which is essentially the same as the lower cam 73 save that the cam 74 is inverted with respect to the lower cam 73, both of the cams 73 and 74 having bearing-passages respectively numbered 75 and 76 by means of which the said cams 73 and 74 are pivotally mounted upon the shaft 53 with freedom for turning movement with respect thereto. Each of the cams 73 and 74 is respectively formed with an arcuate-cam surface 77 and 78 arranged in opposition to each other as is particularly well shown in Figs. 4 to 6 inclusive.

Adjacent the shaft 53 the cams 73 and 74 have respectively rigidly secured thereto substantially diametrically-opposite to the cam-surfaces 77 and 78, relatively-slender upwardly-extending complemental regulator-arm clamping-fingers 79 and 80. The upper cam 74 is provided with a clearance-notch 81 adjacent the shaft 53 to allow the clamping-finger 79 carried by the lower cam 73 to extend upwardly past the upper cam 74, the said clearance-notch terminating sufficiently close to the clamping-finger 80 so that the clamping-fingers 79 and 80 may normally be in close proximity to each other as is particularly well shown in Figs. 4 and 6 of the drawings.

The clamping-fingers 79 and 80 extend upwardly perpendicularly to the cams 73 and 74 and hence the regulating-lever 52, through an arcuate slot 82 formed in the cover-plate 33 and intersecting the upper wall of the transverse clearance-groove 60 therein. The said arcuate-slot 82 is in registration with a similar slot 83 formed in the movement-positioning plate 46 and intersecting the movement-positioning cavity 48. The arcuate-slots 82 and 83 are struck on an arc from the center of the shaft 53 thus enabling the clamping-fingers 79 and 80 to be swung around the said shaft as a center for the purpose later to be described.

The clamping-fingers 79 and 80 extend upwardly through the arcuate-slots 82 and 83 sufficiently into the movement-positioning cavity 48 to pass through an arcuate clearance-slot 84 formed in the rear movement-plate 44 of the timepiece-movement 42 positioned in the movement-positioning cavity 48. As thus arranged the clamping-fingers 79 and 80 are in position to yieldingly but securely engage or clamp the respective opposite sides of the arm 85 of the regulator 86 of the timepiece-movement 42 as is particularly well shown in Fig. 9 of the drawings.

To yieldingly engage the clamping-fingers 79 and 80 with the arm 85 of the regulator 86 of the timepiece-movement 42, the cams 73 and 74 have respectively rigidly secured to the outer ends thereof studs 87 and 88 respectively extending upwardly and downwardly from the adjacent faces of the said cams 73 and 74. To each of the studs 87 and 88 is secured the adjacent end of one of two springs 89—89 the opposite ends of which are jointly secured to a pin or stud 90 upwardly extending from the adjacent end of the cam-actuating bar 61. As thus constructed and arranged the springs 89—89 constantly urge the outer ends of the cams 73 and 74 toward each other or toward the longitudinal axis of the cam-actuating bar 61 with the result that the clamping-fingers 79 and 80 respectively positioned substantially diametrically-opposite to the pins 87—88 at the outer ends of the cams 73—74 are constantly being urged towards each other, thus securely but yieldingly clamping the regulator-arm 85 between them, as previously pointed out.

The clamping-fingers 79 and 80 are moved away from each other or spread apart to allow the admittance or removal of the arm 85 of the regulator 42, by a cam-actuating finger 91 rigidly secured to the cam-actuating bar 61 and extending upwardly therefrom to simultaneously engage the opposed cam-surfaces 77 and 78 of the cams 73 and 74 in the apex formed thereby, all of which may be seen by reference to Figs. 4 to 6 inclusive. As thus constructed and arranged, the cam-actuating finger 91 will, when the cam-actuating bar 61 is moved from the position in which it is shown in Fig. 4 to the position in which it is shown in Fig. 5, act upon the cam-surfaces 77 and 78 to cause the cams 73 and 74 to move outwardly away from each other against the tension of the springs 89—89. As the cams 73 and 74 are moved outwardly the clamping-fingers 79 and 80 carried thereby will also be correspondingly moved away from each other sufficiently to permit the arm 85 of the regulator 86 to be removed from or placed between the said clamping-fingers when the timepiece-movement 42 is being either positioned in the movement-positioning cavity 48 or removed therefrom at the completion of the regulation thereof, as will be later set forth.

To yieldingly hold the cam-actuating bar 61 in the position in which it is shown in Fig. 4 of the drawings, in which position the cam-actuating finger 91 is farthest removed from the shaft 53 and in which position the clamping-fingers 79 and 80 are closest to each other, the said pin 90 to which the outer ends of the springs 89—89 are secured, has also secured thereto one end of a spring 92, the opposite end of which is secured to a stud 93 rigid with and upwardly extending from the inner end of the regulating-lever 52. The spring 92 just referred to, constantly urges the cam-actuating bar 61 and hence the cam-actuating finger 91 away from the cams 73 and 74 thus permitting the springs 89—89 to function to yieldingly hold the clamping-fingers 79 and 80 in their closed or arm-engaging positions. As just pointed out, the spring 92 urges the cam-actuating bar 61 to be moved from left to right as viewed in Fig. 4 of the drawings to the limit imposed thereon by the engagement of one end of the guide-slot 66 with the guide-screw 67 in which position the cam-actuating bar 61 is shown in the figure just referred to.

To move the cam-actuating bar 61 against the tension of the spring 92 from the position in which it is shown in Fig. 4 to that in which it is shown in Fig. 5, the clearance-groove 60 formed in the underside of the cover-plate 33 and in which the regulating-lever 52 and cam-actuating bar 61 and the parts carried thereby are located, has slidably mounted therein a clamping-finger-actuating or movement-transmitting slide generally designated by the reference character 94. The said transmitting-slide 94 is retained in place with capacity for longitudinal sliding movement by two corresponding retaining-plates 95—95 which are seated against shoulders 96—96 one of which is longitudinally formed upon each of the respective opposite sides of the groove 60. The said shoulders 96—96 extend from the outer periphery of the cover-plate 33 to a point just beyond the vertical axis thereof and are formed by widening the groove 60 as at 97—97, the retaining-plates 95—95 being held seated against the shoulders 96—96 by means of screws 98.

The actuating- or transmitting-slide 94 is centrally cut away to form a clearance-opening 99 through which the shaft 53 extends and within which the cams 73 and 74 are located, and is also formed at its outer edge with a finger 100 against which bears the lower end 101 of a slide-actuating arm 102 depending from and pivotally mounted upon the pivot-screw 38 upon which is also pivotally mounted the movement-retaining lever 37 as previously described. Adjacent its inner edge, the actuating- or transmitting-slide 94 is provided with a pair of cam-engaging studs 103 depending from the underside thereof and adapted upon occasion to engage with the inner edges 104—104 of the head-like portion 62 of the cam-actuating bar 61 when the actuating- or transmitting-slide 94 is moved inwardly into the position in which it is shown in Fig. 5 of the drawings, in a manner as will hereinafter appear.

The cam-engaging studs 103 upon engaging the inner edges 104—104 of the head-like portion 62 cause the cam-actuating bar 61 to be moved from the position in which it is shown in Fig. 4 to that shown in Fig. 5, to correspondingly move the cam-actuating finger 91 carried thereby into the position shown in Fig. 5. This movement causes the cam-actuating finger 91 to swing the cams 73 and 74 outwardly away from each other to separate the clamping-fingers 79 and 80 for the release and subsequent removal of the arm 85 of the regulator 86 or for the insertion of the said arm to permit the same to be clamped or gripped by the clamping-fingers, as has been previously described.

To yieldingly hold the actuating- or transmitting-slide 94 in its retired position, the said slide is provided adjacent its outer edge with a pair of depending studs 105—105 to each of which is secured the adjacent end of one of two springs 106—106 the opposite ends of which are secured to a pair of downwardly-extending studs 107—107 rigidly secured to the cover-plate 33 and located within the clearance-groove 60 formed in the under face of the said cover-plate 33.

To move the transmitting-slide 94 inwardly against the tension of the springs 106—106, the fingerpiece 39 of the movement-retaining lever 37 is depressed against the tension of the spring 50 to cause a shoulder 108 formed in the lower edge of the said movement-retaining lever to engage with a pin 109 projecting inwardly from the adjacent face of the slide-actuating arm 102, to thus cause the said arm to be turned about the pivot-screw 38. The turning movement of the slide-actuating arm 102 as just described, will cause the depending-end 101 thereof which latter passes downwardly through a clearance-slot 110 formed in the upper wall of the clearance-groove 60 in the cover-plate 33, to move inwardly to thus slidingly move the actuating- or transmitting-slide 94 inwardly against the tension of the springs 106—106. This inward movement of the transmitting-slide 94 will cause the cam-engaging studs 103 carried at the inner edge of the said transmitting slide to engage with the edges 104—104 of the head 62 as previously described, to effect the sliding movement of the cam-actuating bar 61, which movement will effect the spreading apart of the clamping-fingers 79 and 80 as previously set forth.

Upon release of downward pressure upon the fingerpiece 39 of the movement-retaining lever 37, it will of course be understood that the springs 106—106 will retire the actuating- or transmitting-slide 94 sufficiently to permit the spring 92, previously described, to move the cam-actuating bar 61 and hence the cam-actuating finger 91 carried thereby inwardly from the position in which it is shown in Fig. 5 to that in which it is shown in Fig. 4. This movement will retire the said cam-actuating finger 91 away from the cams 73—74 to thus permit the clamping-fingers 79 and 80 to be moved towards each other to clamp or engage the arm 85 of the regulator 86 between them as has been previously described.

It will be clearly understood from the foregoing that when the fingerpiece 39 of the movement-retaining lever 37 is depressed to the limit of its downward movement, the retaining-nose 40 of the latter will be raised enabling a timepiece-movement to be regulated to be inserted and properly positioned in the movement-positioning cavity 48 as previously described. This full downward movement of the fingerpiece 39 will also cause the slide-actuating arm 102 to slidingly move the actuating- or transmitting-slide 94 inwardly to engage the cam-engaging studs 103—103 thereof with the head-like portion 62 of the cam-actuating bar 61 to move the said bar outwardly. The outward movement of the bar 61 will cause the clamping-fingers 79 and 80 to be moved away from each other as has been previously described for the reception between them of the arm 85 of the regulator 86 forming part of the timepiece-movement to be regulated.

Upon the removal of downward pressure on the fingerpiece 39, the springs 106—106 and 92 will assert themselves to respectively move the actuating- or transmitting-slide 94 and the cam-actuating bar 61 into their normal or retired positions to thus permit the springs 89—89 to move the clamping-fingers 79 and 80 inwardly towards each other for the gripping of the arm 85 between them. The removal of downward pressure on the fingerpiece 39 will also enable the spring 50, secured to the retaining-lever 37, to assert itself to move the retaining-nose 40 thereof downwardly into retaining engagement with the center arbor 41 of the timepiece-movement.

With the arm 85 of the regulator 86 yieldingly but securely clamped between the clamping-fingers 79 and 80, the regulating-lever 52 may be swung from its normal or central position laterally in either direction to correspondingly move the arm 85 into its "fast" or "slow" position to thus cause the regulator 86 to correspondingly shorten or lengthen the hairspring 111 of the timepiece-movement 42 in the usual manner of watches, etc. It will thus be seen that the regulating-lever 52 may be moved laterally a degree sufficient to shorten or lengthen the hairspring 111 the necessary degree for proper timekeeping of the particular timepiece movement being regulated. After being tested in one position with or without the aid of an electric device to be later referred to, the watch-movement may be turned into other positions for testing by turning the body-member 20 in the supporting-ring 23, by turning the said supporting-ring with respect to the mounting-posts 28 and 29, and by combining such turning movements.

After the hairspring 111 has been brought to the necessary length for the proper timekeeping of the timepiece-movement, the fingerpiece 39 is depressed only enough to bring the shoulder 108 formed on the movement-retaining lever 37 into engagement with the pin 109 carried by the slide-actuating arm 102 which degree of movement is sufficient to raise the retaining-nose 40 enough to enable the now regulated or adjusted timepiece-movement 42 to be removed from the movement-positioning cavity 48. After the removal of the timepiece-movement continued downward movement of the fingerpiece 39 will, through the chain of parts 102, 94, 61, 91 and 73 and 74, move the clamping-fingers 79 and 80 away from each other sufficiently to permit the reception between them of the regulator arm 85 of the next succeeding timepiece-movement to be regulated, all in a manner described in more detail hereinafter.

The continued downward movement of the fingerpiece 39, as just above described, will through the slide-actuating arm 102 and the slide 94, cause one of the two cam-engaging studs 103 when the transmitting-slide 94 is moved inwardly, to engage with the adjacent one of two arcuate cams 112—113 forming the inner edge of the enlarged portion 57 of the regulating-lever 52. As the actuating- or transmitting-slide 94 is moved inwardly, the cam-engaging stud 103 adjacent the arcuate cam 112 (which position is shown in full lines in Fig. 6 of the drawings) will coact with the said cam 112 to laterally move the regulating-lever 52 on the shaft 53 as a pivot inwardly towards its central or normal position. With the regulating-lever in its central position, the enlarged portion 57 of the said regulating-lever is brought into registration with the gap between the cam-engaging studs 103—103, thus permitting the said cam-engaging studs on continued movement of the slide 94 to ride off the arcuate cams 112—113 and engage the inner edges 104 of the head-like portion 62 of the cam-actuating bar 61. Further continued inward movement of the transmitting-slide 94 will, through the intermediary of the cam-engaging studs 103—103, move the cam-actuating bar 61 into the position in which it is shown in Fig. 5 of the drawings, for effecting the separation of the clamping-fingers 79 and 80 to enable the said clamping-fingers to receive the arm 85 of the regulator 86 of a timepiece-movement as previously described.

It will thus be seen that in the event of the operator failing to move the regulating-lever 52 into its neutral or central position after the completion of the regulation of a timepiece-movement, that upon the operator fully depressing the fingerpiece 39 for the insertion of another timepiece-movement to be regulated, the regulating-lever 52 will be brought back into its normal or central position prior to the separation of the clamping-fingers 79 and 80. It may here be noted that the separation of the clamping-fingers is of a sufficient degree to receive the arm 85 of the regulator 86 of a timepiece movement even in the event that the said arm is in a position other than its central position thus eliminating the otherwise necessary preliminary positioning of the said arm.

For the purpose of rapidly determining the amount necessary to move the arm 85 of the regulator 86 to obtain the proper length of the hairspring 111, the body-member 20 is provided with an eccentrically-located microphone-receiving recess 114 within which is positioned a crystal microphone or other suitable vibration pick-up device 115. The microphone 115 is yieldingly held in place within the recess 114 by resilient packing 116 interposed between the under side of the said microphone and a closure-plate 117 (Fig. 2) securely attached to the bottom of the body-member 20 by screws 118.

Centrally located with respect to the microphone recess 114 and upwardly extending therefrom, is a clearance-passage 119 which receives with capacity for longitudinal reciprocating movement, a beat-frequency-transmitting rod or plunger 120. The said rod or plunger is of sufficient length to pass upwardly through the clearance-groove 60 formed in the cover-plate 33 to one side of the regulating-lever 52 and upwardly through the clearance-opening 99 formed in the transmitting-slide 94. The upper end of the said rod or plunger passes through a guide-passage 121 intersecting the movement-receiving cavity 48 and the clearance-groove 60.

The upper end of the beat-frequency-transmitting rod or plunger 120 abuts against the under side of the rear movement-plate 44 of the timepiece-movement 42 closely adjacent to the escape-wheel (not shown) forming part of the customary escapement of a timepiece-movement. At its lower end, the frequency-transmitting rod or plunger 120 is formed with an enlarged cylindrical head 122 positioned in an enlarged portion 123 of the clearance-passage 119, the said enlarged portion 123 opening downwardly into the microphone-receiving recess 114. As clearly shown in Fig. 8 of the drawings, the enlarged head 122 of the frequency-transmitting rod 120 is seated against and in contact with the crystal microphone 115.

Figure 2:
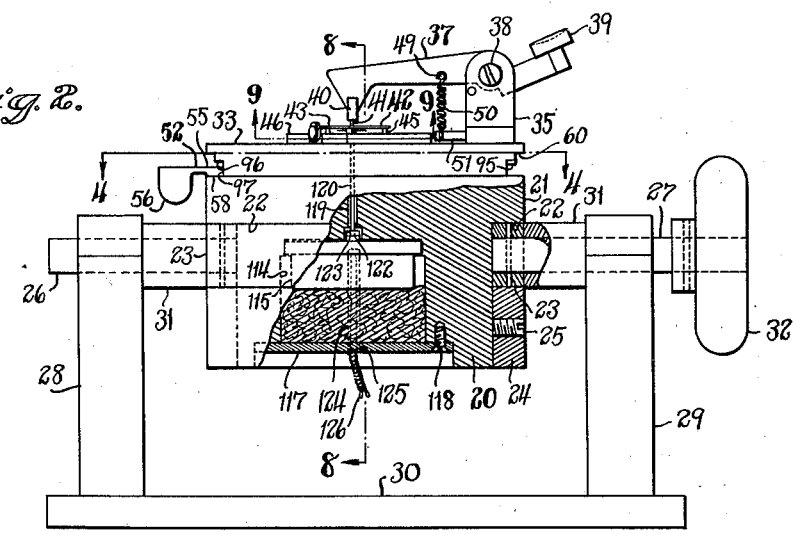
Fig. 2 is a side view thereof mainly in side elevation and partly in vertical central section.
Figure 3:
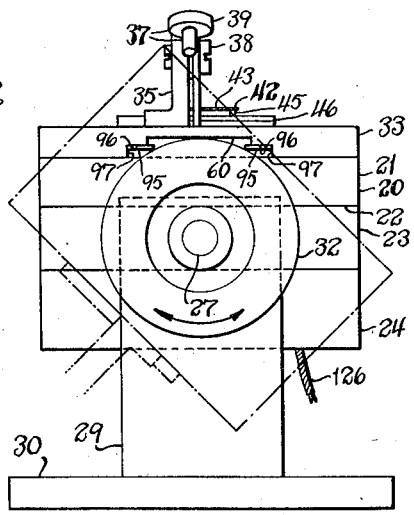
Fig. 3 is a an end view thereof.

As shown particularly well in Figs. 1 and 2 of the drawings, the microphone-receiving recess 114 is provided at one side thereof with a longitudinal cable-receiving groove 124 which is in registration with an opening 125 in the closure-plate 117. The longitudinal groove 124 receives a flexible shielded cable 126 which is electrically connected to the crystal microphone 115 and to any suitable indicating device such, for instance, as a cathode-ray tube or other suitable rating device by means of which the beat of the escapement of the timepiece-movement 42 may be compared to a predetermined standard beat-frequency.

It will thus be seen that the beat of the escapement forming part of the time-piece movement 42 will be transmitted through the beat-frequency-transmitting rod or plunger 119 to the crystal microphone 115 which, in turn, transmits the said beat through the shielded cable 126 to an oscillograph or the like, whereby the beat of the escapement may be compared to a standard beat-frequency to determine whether the escapement is running fast or slow. The operator may now manipulate the regulating-lever 52, increasing or decreasing the length of the hair-spring 111 the required degree to bring the beat of the escapement in synchronism with the predetermined standard beat-frequency, after which the timepiece-movement may be removed, as previously described.

When the timepiece-movement 42 is in place and securely held, as previously described, the manipulation of the regulating-lever, above referred to, will shift the regulator of the said timepiece-movement as desired by the operator, to properly regulate the timepiece-movement. After one test has been made, the body-member 20, together with the timepiece-movement, may be turned, before the said timepiece is removed, into a variety of other positions by being either rotated about its own axis or upon being turned about a horizontal axis by the hand-wheel 32 previously described, into a variety of vertical and horizontal positions and other readings made to determine whether these changes in position affect the timekeeping property of the timepiece-movement just previously adjusted.

It will thus be seen that with the regulating-device illustrated in the drawings and just described, timepiece-movements may be readily, effectively and accurately regulated, and that the same may be adjusted or regulated when they are in a variety of positions substantially corresponding to positions and movements to which they may be subjected when in use.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A device for regulating timepieces having a movable regulator, comprising: a movement-holder; beat-frequency pick-up means associated with the said movement-holder; shiftable regulator-engaging means carried by the said movement-holder and supported thereby for engagement with the movable regulator of a timepiece being tested whereby the said regulator may be adjusted; guide-means also carried by the said movement-holder and guiding the said regulator-engaging means in a predetermined path of movement; and movement-locating means associated with the said movement-holder and locating a timepiece being tested in predetermined oriented position with respect to the said regulator-engaging means carried by the said movement-holder.

2. A device for regulating timepieces having a movable regulator, comprising: a movement-holder; releasable-means for retaining a timepiece-movement in the said movement-holder; beat-frequency pick-up means associated with the said movement-holder; regulator-engaging means carried by the said movement-holder and held thereby in position for releasable engagement with the movable regulator of the timepiece being tested independently of and supplemental to the action of the aforesaid means for retaining the timepiece-movement; and means releasably holding the said regulator-engaging means in operative relationship with respect to the regulator of the said timepiece.

3. A device for regulating timepieces comprising: a movement-holder; releasable-means for retaining a timepiece-movement in place in the said movement-holder; regulator-engaging means carried by the said movement-holder and held thereby in position for releasable engagement with the regulator of the timepiece-movement being tested for shifting the same; sound-responsive beat-frequency pick-up means associated with the said movement-holder and responding to the sound produced by the beat of the escapement of the timepiece-movement in the said movement-holder, to enable the frequency of the beat to be compared with a standard beat-frequency; and means releasably holding the said regulator-engaging means in operative relationship with respect to the regulator of the said timepiece.

4. A device for regulating timepieces comprising: a mounting-frame; a movement-holder tiltably connected to the said mounting-frame; releasable-means for retaining a timepiece-movement in place in the said movement-holder; regulator-engaging means carried by the said movement-holder and held thereby in position for releasable engagement with the regulator of the timepiece-movement being tested for shifting the same; beat-frequency pick-up means movable with the said movement-holder and responding to the beat of the escapement of the timepiece-movement in the said movement-holder, to enable the frequency of the beat to be compared with a standard beat-frequency; and means releasably holding the said regulator-engaging means in operative relationship with respect to the regulator of the said timepiece.

5. A device for regulating timepieces comprising: a mounting-frame; a holder-carrier pivoted to the said mounting-frame; a movable-holder connected to the said holder-carrier with capacity for turning movement with respect thereto about an axis which is substantially perpendicular with respect to the axis about which the said holder-carrier tilts with respect to the said mounting-frame; releasable-means for retaining a timepiece-movement in place in the said movement-holder; regulator-engaging means carried by the said movement-holder and held thereby in position for releasable engagement with the regulator of the timepiece being tested for shifting the same; beat-frequency pick-up means carried by the said movement-holder and responding to the beat of the escapement of the timepiece-movement in the said movement-holder, to enable the frequency of the beat to be compared with a standard beat-frequency; and means releasably holding the said regulator-engaging means in operative relationship with respect to the regulator of the said timepiece.

6. A device for regulating timepieces comprising: a movement-holder; mounting-means pivotally connected to the said movement-holder and constructed and arranged to permit the said movement-holder to be turned about two distinct axes, respectively substantially perpendicular with respect to each other; releasable-means for retaining a timepiece-movement in place in the said movement-holder; manually-operable regulator-engaging means movable independently of the said releasable-means and carried by the said movement-holder and held thereby in position for releasable engagement with the regulator of the timepiece-movement being tested for shifting the same; beat-frequency pick-up means associated with the said movement-holder and responding to the beat of the escapement of the timepiece-movement in the said movement-holder to enable the frequency of the beat to be compared with a standard beat-frequency; and means releasably holding the said regulator-engaging means in operative relationship with respect to the regulator of the said timepiece.

7. A device for regulating timepieces comprising: a movement-holder; releasable-means for retaining a timepiece-movement in place in the said movement-holder; mounting-means for the said movement-holder constructed and arranged to permit the said movement-holder to be turned with respect to the said mounting-means about two distinct axes, respectively substantially perpendicular with respect to each other; manually-operable regulator-engaging means carried by and turnable with the said movement-holder and held thereby in position for releasable engagement with the regulator of the timepiece-movement being tested for shifting the same; and means releasably holding the said regulator-engaging means in operative relationship with respect to the regulator of the said timepiece.

8. A device for regulating timepieces comprising: a movement-holder; a shiftable jaw-carrier carried by the said movement-holder; a pair of clamping jaws connected to the said jaw-carrier with capacity for joint movement therewith and for movement toward and away from each other relative to the said jaw-carrier and constructed and arranged to grip between them the regulator of a timepiece-movement carried by the said movement-holder; means holding the said jaw-carrier and the said clamping-jaws in place with respect to the said movement-holder and maintaining the said clamping-jaws in operative relationship with respect to the regulator of a timepiece; and means also organized wtih the said movement-holder for moving the said clamping-jaws toward and away from each other to respectively grip and release the regulator of a timepiece-movement carried by the said movement-holder.

9. A device for regulating timepieces comprising: a movement-holder; a shiftable jaw-carrier organized with the said movement-holder; a pair of clamping-jaws connected to the said jaw-carrier with capacity for movement therewith and for movement toward and away from each other relative to the said jaw-carrier, and constructed and arranged to grip between them the regulator of a timepiece-movement carried by the said movement-holder; means holding the said jaw-carrier and the said clamping-jaws in place with respect to the said movement-holder and maintaining the said clamping-jaws in operative relationship with respect to the regulator of a timepiece; spring-means yieldingly urging the said clamping-jaws toward each other and means also organized with the said movement-holder for separating the said clamping-jaws against the tension of the said spring-means to place the said clamping-jaws in position to receive between them the regulator of a timepiece-movement carried by the said movement-holder.

10. A device for regulating timepieces comprising: a movement-holder; releasable-means for retaining a timepiece-movement in the said movement-holder; a shiftable jaw-carrier; a pair of clamping-jaws connected to the said jaw-carrier with capacity for movement therewith and for movement toward and away from each other relative to the said jaw-carrier, and constructed and arranged to grip between them the regulator of a timepiece-movement carried by the said movement-holder; and an operative connection between the aforesaid releasable-means and the said clamping-jaws and constructed and arranged to open the said clamping-jaws to receive between them the regulator of a timepiece-movement carried by the said movement-holder when the said releasable-means is retired.

11. A device for regulating timepieces comprising: a movement-holder; releasable-means for retaining a timepiece-movement in the said movement-holder; a shiftable jaw-carrier; a pair of clamping-jaws connected to the said jaw-carrier with capacity for movement therewith and for movement toward and away from each other relative to the said jaw-carrier, and constructed and arranged to grip between them the regulator of a timepiece-movement carried by the said movement-holder; spring-means yieldingly urging the said clamping-jaws toward each other; and operating-means operatively interconnecting the said releasable-means with the said clamping-jaws and constructed and arranged to separate the said jaws when the said releasable-means is moved in a direction for releasing a timepiece-movement carried by the said movement-holder.

12. A device for regulating timepieces comprising: a movement-holder; releasable-means for retaining a timepiece-movement in the said movement-holder; a shiftable jaw-carrier; a pair of clamping-jaws connected to the said jaw-carrier with capacity for movement therewith and for movement toward and away from each other relative to the said jaw-carrier, and constructed and arranged to grip between them the regulator of a timepiece-movement carried by the said movement-holder; and lost-motion connecting-means operatively interposed between the said releasable-means and the said clamping-jaws and constructed and arranged to permit the said releasable-means to be retired partially without actuating the said clamping-jaws and to transmit the further movement of the said releasable-means to the said clamping-jaws for separating the same.

13. A device for regulating timepieces comprising: a movement-holder releasable-means for retaining a timepiece-movement in the said movement-holder; a shiftable jaw-carrier; a pair of clamping-jaws connected to the said jaw-carrier with capacity for movement therewith and for movement toward and away from each other relative to the said jaw-carrier, and constructed and arranged to grip the regulator of a timepiece-movement carried by the said movement-holder, between them; spring-means yieldingly urging the said clamping-jaws toward each other; and lost-motion connecting-means operatively interposed between the said releasable-means and the said clamping-jaws and constructed and arranged to permit the said releasable-means to be retired partially without actuating the said clamping-jaws and to transmit the further movement of the said releasable-means to the said clamping-jaws for separating the same against the tension of the said spring-means.

14. A device for regulating timepieces comprising: mounting-means; a movement-holder connected to the said mounting-means with capacity for tilting movement with respect thereto; releasable-means for retaining a timepiece-movement in place in the said movement-holder for tilting movement therewith with respect to the said mounting-means; a shiftable jaw-carrier carried by the said movement-holder; a pair of clamping-jaws connected to the said jaw-carrier with capacity for movement therewith and for movement toward and away from each other relative to the said jaw-carrier, and constructed and arranged to grip between them the regulator of a timepiece-movement carried by the said movement-holder; means holding the said jaw-carrier and the said clamping-jaws in place with respect to the said movement-holder and maintaining the said clamping-jaws in operative relationship with respect to the regulator of a timepiece; and means also carried by the said movement-holder and constructed and arranged to move the said clamping-jaws toward and away from each other to respectively grip and release the regulator of a timepiece-movement carried by the said movement-holder.

15. A device for regulating timepieces comprising: mounting-means; a movement-holder connected to the said mounting-means with capacity for tilting movement with respect thereto; releasable-means for retaining a timepiece-movement in place in the said movement-holder for tilting movement therewith with respect to the said mounting-means; a shiftable jaw-carrier carried by the said movement-holder; a pair of clamping-jaws connected to the said jaw-carrier with capacity for movement therewith and for movement toward and away from each other relative to the said jaw-carrier, and constructed and arranged to grip between them the regulator of a timepiece-movement carried by the said movement-holder; spring-means yieldingly urging the said clamping-jaws toward each other; and connecting-means operatively interposed between the said releasable-means and the said clamping-jaws and constructed and arranged to open the said clamping-jaws against the tension of the said spring-means when the said releasable-means is moved into its retired position.

16. A device for regulating timepieces comprising: a mounting-frame; a holder-carrier pivoted to the said mounting-frame; a movement-holder pivoted to the said holder-carrier with capacity for turning movement with respect thereto about an axis which is substantially perpendicular with respect to the axis about which the said holder-carrier tilts with respect to the said mounting-frame; releasable-means for retaining a timepiece-movement in the said movement-holder; a shiftable jaw-carrier carried by the said movement-holder; a pair of clamping-jaws carried by the said jaw-carrier with capacity for movement therewith and for movement toward and away from each other relative to the said jaw-carrier and constructed and arranged to grip the regulator of a timepiece-movement carried by the said movement-holder, between them; spring-means urging the said clamping-jaws toward each other; and lost-motion connecting-means operatively interposed between the said releasable-means and the said clamping-jaws and constructed and arranged to separate the said clamping-jaws from each other when the said releasable-means is moved into its retired position.

WALTER KOHLHAGEN.